United States Patent [19]
Watanabe et al.

[11] 4,447,591
[45] May 8, 1984

[54] POLYURETHANE

[75] Inventors: Shoji Watanabe; Takuya Miho, both of Ohtake, Japan

[73] Assignee: Daicel Chemical Industries, Ltd., Sakai, Japan

[21] Appl. No.: 351,578

[22] Filed: Feb. 23, 1982

[30] Foreign Application Priority Data

May 8, 1981 [JP] Japan .................. 56-69077

[51] Int. Cl.$^3$ ............... C08G 18/42; C08G 63/10
[52] U.S. Cl. ..................... 528/80; 528/81; 528/354; 528/357
[58] Field of Search ........... 528/354, 355, 357, 80, 528/81; 560/185

[56] References Cited

U.S. PATENT DOCUMENTS

| | | | |
|---|---|---|---|
| 2,890,208 | 6/1959 | Young et al. | 528/354 X |
| 3,169,945 | 2/1965 | Hostettler et al. | 528/354 X |
| 3,284,417 | 11/1966 | Hostettler et al. | 528/354 X |
| 3,663,515 | 5/1972 | Hostettler et al. | 528/354 X |
| 4,289,873 | 9/1981 | Kubo et al. | 528/357 |
| 4,300,565 | 11/1981 | Rosenaft et al. | 528/354 X |
| 4,357,462 | 11/1982 | Kubo et al. | 528/357 |

FOREIGN PATENT DOCUMENTS 1201909  8/1970  United Kingdom .

Primary Examiner—Earl A. Nielsen
Attorney, Agent, or Firm—Flynn, Thiel, Boutell & Tanis

[57] ABSTRACT

A polyurethane comprises (a) organic diisocyanate units and (b) polycaprolactone polyol units having a narrow molecular weight distribution in which a ratio of the weight average molecular weight to the number average molecular weight is in the range of from 1.1 to 2.0 and the average molecular weight is 500 to 5,000, the units (a) and (b) being connected linearly through urethane linkages.

3 Claims, No Drawings

POLYURETHANE

The present invention relates to a lactone polymer, especially a lactone polymer having a narrow molecular weight distribution, and a process for the preparation thereof. Moreover, the invention relates to a polyurethane and a process for the preparation thereof. More particularly, the invention relates to a polyurethane which is excellent in the elastic recovery and has a very good operation adaptability because of a low viscosity thereof and a process for the preparation thereof. The polyurethane is obtained from diisocyanate and the before mentioned lactone polymer. The lactone polymer having a molecular weight of 500 to 5,000 is very valuable as a starting material to be used for manufacture of polyurethanes, paints and the like.

Conventional lactone polymers having a molecular weight of 500 to 5,000, however, have a broad molecular weight distribution and the ratio of the weight average molecular weight to the number average molecular weight is in the range of from 2.5 to 3.5. When such polymers are actually used, various problems are caused by this broad molecular weight distribution.

We made researches on molecular weight distributions of conventional lactone polymers by gel permeation chromatography (hereinafter referred to as "GPC"), and found that if the molecular weight distribution is appropriately adjusted, lactone polymers giving practically very excellent characteristics can be obtained. We have now completed the present invention based on this finding.

More specifically, in accordance with the present invention, there are provided a lactone polymer having a narrow molecular weight distribution, which is characterized in that the ratio of the weight average molecular weight to the number average molecular weight is in the range of from 1.1 to 2.0 and the molecular weight is 500 to 5,000, and a process for the preparation of such lactone polymer.

By the term "lactone polymer" used in the present invention is meant a polymer obtained by subjecting ε-caprolactone to ring-opening polymerization in the presence of an initiator containing an active hydrogen atom. As the initiator, there can be used polyhydric alcohols such as diols and triols and polyvalent amines. As the diol, there can be mentioned ethylene glycol, propylene glycol, diethylene glycol, 1,4-butylene glycol, 1,6-hexane diol and neopentyl glycol. As the triol, there can be listed glycerin and trimethylol-propane. Other polyhydric alcohols include pentaerythritol, acrylic polyols, styrene/allyl alcohol copolymers and polymeric resins having hydroxyl groups such as polyester-polyols, epoxy resins, polyether polyols and cellulose derivatives. The polyvalent amine include ethylene diamine, diethylene triamine and ethanol amine. Moreover aromatic polyamines may be used here.

By the term "molecular weight" used in the present invention is meant a value calculated from the hydroxyl value of the lactone polymer according to the following formula:

$$\text{Molecular weight} = \frac{[\text{hydroxyl value}] \times [N] \times 1000}{56.0}$$

The hydroxyl value is determined according to the method of JIS K-1557 6.4. In the above formula, N represents the number of functional groups of the initiator.

The molecular weight of the lactone polymer of the present invention is 500 to 5,000.

As is apparent from the foregoing description, the amount of the polymerization initiator necessary for obtaining a predetermined molecular weight can be defined according to the above calculation formula.

The ratio of the weight-average molecular weight $\overline{M}w$ to the number-average molecular weight $\overline{M}n$, that is, the molecular weight distribution, is determined by GPC.

Apparatus:
  Model LC-3A manufactured by Shimazu Seisakusho
Solvent:
  tetrahydrofuran, 1 ml/min
Temperature:
  room temperature
Columns:
  HSG-PRE (one), HSG-20 (one), HSG-15 (three) and HSG-10 (one)
  (each being supplied by Shimazu Seisakusho)
Detector:
  Shodex RI SE-11 (supplied by Showa Denko)

The ratio of the weight average molecular weight to the number average molecular weight is in the range of from 1.1 to 2.0.

The process for the preparation of the polymer of the present invention will now be described.

In the preparation process according to the present invention, a stannous halide such as stannous chloride, stannous bromide or stannous iodide is used as a catalyst. The amount used of the catalyst is 0.1 to 50 ppm based on the total weight of ε-caprolactone. If the amount used of the catalyst is smaller than 0.1 ppm, polymerization is not advanced, and if the amount used of the catalyst is larger than 50 ppm, it becomes difficult to obtain a polymer having a narrow molecular weight. The reaction temperature is ordinarily 100° to 230° C. and preferably 120° to 190° C.

Since a known catalyst, TBT (tetrabutyl titanate), contributes not only to ring-opening polymerization but also to ester exchange reaction, use of this catalyst results in production of a polymer having a broad molecular weight distribution.

The lactone polymer of the present invention has a narrower molecular weight distribution than the conventional lactone polymer and also has a lower viscosity and a slightly lower melting point than those of the conventional polymer.

Since the molecular distribution of the lactone polymer of the present invention is narrow, it is very valuable as a starting material to be used for manufacture of urethane elastomers, urethane adhesives, urethane paints and polyurethanes.

For example, when the polymer of the present invention is used in the field of spandex fibers, there can be provided products excellent in the elastic recovery characteristics. Furthermore, there can be provided a high-solid paint as a polyol component of a two-pack type urethane paint.

Polyurethanes having a linear structure have heretofore been synthesized by reacting a polyol having hydroxyl groups on both the molecule ends, an organic diisocyanate and a chain extender having a relatively low molecular weight such as a diol or diamine. As the polyol having hydroxyl groups on both the molecule ends, there are used polyester type polyols and polyether type polyols. As the polyester type polyol, there are ordinarily used a polyester polyol synthesized from ethylene glycol or 1,4-butylene glycol and adipic acid and a polycaprolactone polyol prepared from ε-caprolactone. The conventional polycaprolactone polyol is defective in that it is inferior to polyether type polyols, especially polytetramethylene glycol (PTMG), in the elastic recovery. Accordingly, the conventional polycaprolactone polyol cannot be used in the fields where a high elastic recovery is required. When polyester type polyols are used for the synthesis of urethane prepolymers to be used for casting or urethane type adhesives, their operation adaptability is bad because of a high viscosity, and if the viscosity is reduced so as to improve the operation adaptability, the characteristics of the resulting polyurethanes are degraded.

We made researches with a view to eliminating these defects of conventional polycaprolactone type polyurethanes, and we found that a polyurethane prepared by using a polycaprolactone polyol having a narrow molecular weight distribution has an excellent elastic recovery not observed in the conventional products and it has a lower viscosity than those of the conventional products and a highly improved operation adaptability in the synthesis of prepolymers and urethane type adhesives. We have now completed the present invention based on this finding.

More specifically, the present invention relates a polyurethane prepared by reacting an organic diisocyanate with a compound containing at least two active hydrogen atoms in the molecule, wherein a polycaprolactone polyol having a narrow molecular weight distribution in which the ratio of the weight average molecular weight to the number average molecular weight is in the range of from 1.1 to 2.0 and the average molecular weight is 500 to 5,000, is used as the active hydrogen atom-containing compound, and a process for the preparation thereof.

As the organic diisocyanate that is used in the present invention, there can be mentioned, for example, 2,4-tolylene diisocyanate, 2,6-tolylene diisocyanate, 4,4'-diphenylmethane diisocyanate, tolidine diisocyanate, hexamethylene diisocyanate, isophorone diisocyanate and 1,5-naphthalene diisocyanate. As the chain extender that is used in carrying out the present invention, there are preferably used ethylene glycol, propylene glycol, 1,4-butylene glycol and 1,6-hexamethylene diol. Furthermore, there can be used ethylene diamine, propylene diamine and hydrazine.

For preparing the polyurethane of the present invention, there is preferably adopted a prepolymer process comprising reacting a polyol with an excessive amount of an organic isocyanate to form an isocyanate-terminated prepolymer and then reacting the formed prepolymer with a chain extender such as a diol or diamine. As the solvent to be used for the preparation of a solution type polyurethane, such as a urethane adhesive, there can be used ordinary solvents such as toluene, ethyl acetate, methylethyl ketone and dimethylformamide.

The polycaprolactone type polyurethane of the present invention is excellent over the conventional products in the elastic recovery and has a low viscosity and a good operation adaptability. This is due to the fact that the molecular distribution of the polycaprolactone polyol is narrow and in the range of from 1.1 to 2.0.

The polyurethane of the present invention can be used very advantageously for manufacture of a spandex products, adhesives, artificial leathers and paints.

The present invention will now be described in detail with reference to the following Examples and Comparative Examples that by no means limit the scope of the invention. In these Examples, all of "parts" are by weight.

EXAMPLES 1 THROUGH 4 AND COMPARATIVE EXAMPLES 1 THROUGH 3

[Polymer Having Molecular Weight of 2000]

A three-neck separable flask having a capacity of 1 liter was charged with 969 g (8.5 moles) of ε-caprolactone, 31 g (0.5 mole) of ethylene glycol and a predetermined amount of a catalyst. A thermometer, a condenser and a nitrogen-introducing tube were attached to the flask, and reaction was carried out at a predetermined temperature in a nitrogen gas atmosphere. When the content of ε-caprolactone measured by gas chromatography was lower than 0.5%, the reaction was stopped, and the reaction product was cooled and withdrawn.

EXAMPLE 5 AND COMPARATIVE EXAMPLE 4

[Polymer Having Molecular Weight of 1250]

Procedures of the foregoing Examples were repeated in the same manner except that 594 g (5.2 moles) of ε-caprolactone and 31 g (0.5 mole) of ethylene glycol were charged.

TABLE 1

| Example No. | Molecular Weight | Reaction Conditions | | | $\overline{Mw}/\overline{Mn}$ | Melting Point (°C.) | Viscosity (cps, at 75° C.) |
| | | Catalyst (ppm) | Temperature (°C.) | Time (hours) | | | |
| --- | --- | --- | --- | --- | --- | --- | --- |
| Comparative Example 1 | 2000 | TBT, 10 | 170 | 7–8 | 2.98 | 49–50 | 350 |
| Comparative Example 2 | 2000 | " | 200 | 1.5 | 2.83 | | |
| Comparative Example 3 | 2000 | " | 140 | 14 | 2.58 | | |
| Example 1 | 2000 | SnCl$_2$, 5 | 170 | 5.5 | 1.76 | 45–46 | 204 |
| Example 2 | 2000 | " | 140 | 34.0 | 1.61 | | |
| Example 3 | 2000 | SnCl$_2$, 20 | 140 | 3 | 1.54 | | |
| Example 4 | 2000 | " | 130 | 16 | 1.55 | | |
| Comparative Example 4 | 1250 | TBT, 10 | 170 | 7–8 | 2.55 | 45–47 | 160 |

TABLE 1-continued

| Example No. | Molecular Weight | Reaction Conditions | | | Mw/Mn | Melting Point (°C.) | Viscosity (cps, at 75° C.) |
| --- | --- | --- | --- | --- | --- | --- | --- |
| | | Catalyst (ppm) | Temperature (°C.) | Time (hours) | | | |
| Example 5 | 1250 | SnCl$_2$, 5 | 170 | 6.5 | 1.51 | 37–39 | 91 |

Note
The melting point was measured by a melting point measuring device Model MP supplied by Yanagimoto Seisakusho. The viscosity was measured by a B-type rotary viscometer. The molecular weight distribution Mw/Mn was determined according to the GPC method.

SYNTHESIS EXAMPLE 6

A four-neck flask equipped with a stirrer, a thermometer, a nitrogen introducing tube and a condenser was charged with 1938 parts of ε-caprolactone, 62 parts of ethylene glycol and 0.01 part of stannous chloride, and reaction was carried out at 170° C. for 5.5 hours to obtain a polycaprolactone polyol having a hydroxyl value of 56.2 KOH mg/g (the unit will be omitted hereinafter), an acid value of 0.27 KOH mg/g (the unit will be omitted hereinafter), a viscosity of 204 cps at 75° C. and a molecular weight distribution of 1.73.

EXAMPLE 7

Physical properties of a polyurethane elastomer prepared by reacting 200 parts of the polycaprolactone polyol obtained in Synthesis Example 6 which had a molecular distribution of 1.73, with 75 parts of 4,4'-diphenylmethane diisocyanate at 80° C. for 1 hour and subjecting the reaction product to addition polymerization with 12 parts of 1,4-butylene glycol as the chain extender, were as follows.

100% Modulus: 40 Kg/cm$^2$
300% Modulus: 90 Kg/cm$^2$
Tensile strength: 392 Kg/cm$^2$
Elongation: 565%
Elastic recovery: 65%
JIS Hardness A: 80

The elastic recovery means the elasticity recovery ratio (20° C.) determined by stretching the sample by 300%, allowing the sample to stand still for 10 minutes from release of stretching and making calculation according to the following formula:

$$\text{Elastic recovery} = \left(1 - \frac{l'-l}{l}\right) \times 100$$

in which l stands for the distance between standard lines before stretching and l' stands for the distance between standard lines after stretching and releasing.

SYNTHESIS EXAMPLE 8

In the same manner as described in Synthesis Example 6, reaction was carried out at 130° for 16 hours by using 1938 parts of ε-caprolactone, 62 parts of ethylene glycol and 0.02 part of stannous chloride to obtain a polycaprolactone polyol having a hydroxyl value of 56.2, an acid value of 0.20, a viscosity of 151 cps at 75° C. and a molecular weight distribution of 1.45.

EXAMPLE 9

The polycaprolactone polyol having a molecular weight distribution of 1.45, which was obtained in Synthesis Example 8, was reacted in the same manner according to the same recipe as in Example 7. Physical properties of the obtained polyurethane elastomer were as follows.

100% Modulus: 39 Kg/cm$^2$
300% Modulus: 88 Kg/cm$^2$
Tensile strength: 350 Kg/cm$^2$
Elongation: 600%
Elastic recovery: 80%
JIS Hardness A: 79

COMPARATIVE EXAMPLE 5

In the same manner as described in Synthesis Example 6, reaction was carried out at 170° C. for 6 hours by using 1938 parts of ε-caprolactone, 62 parts of ethylene glycol and 0.02 part of tetrabutyl titanate to obtain a polycaprolactone polyol having a hydroxyl value of 52.1, an acid value of 0.21, a viscosity of 350 cps at 75° C. and a molecular weight distribution of 2.98.

The so-obtained polycaprolactone polyol was reacted in the same manner according to the same recipe as in Example 7. Physical properties of the obtained polyurethane elastomer were as follows.

100% Modulus: 39 Kg/cm$^2$
300% Modulus: 95 Kg/cm$^2$
Tensile strength: 440 Kg/cm$^2$
Elongation: 550%
Elastic recovery: 40%
JIS Hardness A: 80

COMPARATIVE EXAMPLE 6

In the same manner as described in Synthesis Example 6, reaction was carried out at 130° C. for 16 hours by using 1938 parts of ε-caprolactone, 62 parts of ethylene glycol and 0.02 part of tetrabutyl titanate to obtain a polycaprolactone polyol having a hydroxyl value of 56.2, an acid value of 0.22, a viscosity of 320 cps at 75° C. and a molecular weight distribution of 2.58.

The so-obtained polycaprolactone polyol was reacted in the same manner according to the same recipe as in Example 7. Physical properties of the obtained polyurethane elastomer were as follows.

100% Modulus: 40 Kg/cm$^2$
300% Modulus: 93 Kg/cm$^2$
Tensile strength: 430 Kg/cm$^2$
Elongation: 550%
Elastic recovery: 50%
JIS Hardness A: 80

EXAMPLE 10

A 4-neck flask equipped with a stirrer, a thermometer, a dropping funnel, a nitrogen introducing tube and a condenser was charged with 200 parts of the polycaprolactone polyol obtained in Synthesis Example 8, which had a molecular distribution of 1.45, 31.2 parts of neopentyl glycol, 101 parts of 4,4'-diphenylmethane diisocyanate and 635 parts of methylethyl ketone as the solvent, and 0.7 part of methanol was used as the reaction stopper. Reaction was conducted at 75° C. for 8 hours to obtain a polyurethane solution having a solid content of 35% and a viscosity of 32,000 cps at 25° C. The polyurethane solution was cast on a glass sheet and dried at 40° C. overnight to obtain a transparent polyurethane film having the following physical properties.

100% Modulus: 18 Kg/cm$^2$

Tensile strength: 160 Kg/cm$^2$

Elongation: 600%

Elastic recovery: 80%

COMPARATIVE EXAMPLE 7

The polycaprolactone obtained in Comparative Example 5, which had a molecular weight distribution of 2.98, was reacted in the same manner according to the same recipe as in Example 10 to obtain a polyurethane solution having a solid content of 35% and a viscosity of 48,000 at 25° C. A film prepared from this polyurethane solution had the following physical properties.

100% Modulus: 18 Kg/cm$^2$

Tensile strength: 170 Kg/cm$^2$

Elongation: 580%

Elastic recovery: 40%

The embodiments of the invention of which an exclusive privilege and property is claimed are defined as follows:

1. A process for the preparation of polyurethanes which comprises reacting an organic diisocyanate with a polycaprolactone polyol having a narrow molecular weight distribution in which the ratio of the weight average molecular weight to the number average molecular weight is in the range of from 1.1 to 2.0 and the average molecular weight is 500 to 5,000, said polycaprolactone polyol having been prepared by subjecting a lactone to ring-opening polymerization in the presence of 0.1 to 50 ppm of stannous halide selected from the group consisting of stannous chloride, stannous bromide and stannous iodide, as a catalyst, and at a temperature of from 100° to 230° C.

2. A process claimed in claim 1 in which said lactone is epsilon-caprolactone.

3. A polyurethane prepared by the process of claim 1.

* * * * *